United States Patent
Forest et al.

(10) Patent No.: US 7,467,029 B2
(45) Date of Patent: Dec. 16, 2008

(54) DUAL PROCESSOR SUPERVISORY CONTROL SYSTEM FOR A VEHICLE

(75) Inventors: Thomas M. Forest, Macomb Township, MI (US); Kerfegar K. Katrak, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 311 days.

(21) Appl. No.: 11/054,571

(22) Filed: Feb. 9, 2005

(65) Prior Publication Data

US 2006/0126256 A1    Jun. 15, 2006

Related U.S. Application Data

(60) Provisional application No. 60/636,768, filed on Dec. 15, 2004.

(51) Int. Cl.
   *G06F 11/08* (2006.01)
(52) U.S. Cl. .............................. 701/1; 701/29; 701/33; 340/507; 340/508
(58) Field of Classification Search .................. 701/33, 701/31, 29, 32, 1; 340/439, 459, 507, 508, 340/531, 532, 3.43; 369/44.29, 53.37, 53.28
See application file for complete search history.

(56) References Cited

U.S. PATENT DOCUMENTS

| | | | |
|---|---|---|---|
| 6,243,629 B1 * | 6/2001 | Sugimoto et al. ............. 701/29 |
| 6,256,569 B1 * | 7/2001 | Kobayashi .................... 701/70 |
| 6,408,170 B1 * | 6/2002 | Schmidt et al. ............. 455/344 |
| 6,422,659 B2 * | 7/2002 | Disser ......................... 303/20 |
| 6,493,616 B1 * | 12/2002 | Rossow et al. ................ 701/29 |
| 6,775,609 B2 * | 8/2004 | Ozeki et al. ................. 701/114 |
| 6,892,129 B2 * | 5/2005 | Miyano ...................... 701/107 |
| 6,944,532 B2 * | 9/2005 | Bellinger .................... 701/115 |
| 6,990,404 B2 * | 1/2006 | Takeuchi .................... 701/114 |
| 7,039,515 B2 * | 5/2006 | Eich et al. ..................... 701/51 |
| 2002/0029098 A1 * | 3/2002 | Sakurai et al. .................. 701/1 |
| 2002/0080026 A1 * | 6/2002 | Wagner et al. .............. 340/507 |
| 2002/0123828 A1 * | 9/2002 | Bellmann et al. .............. 701/1 |
| 2002/0141299 A1 * | 10/2002 | Turner et al. ............. 369/44.29 |
| 2002/0183904 A1 * | 12/2002 | Sakurai et al. ................ 701/33 |
| 2003/0171858 A1 * | 9/2003 | Kondo ......................... 701/29 |

* cited by examiner

*Primary Examiner*—Tuan C To

(57) ABSTRACT

A vehicle control module for controlling an actuator unit in response to an input having a first processor, a first communication link coupled to the first processor, and a second processor coupled to the first processor via the first communication link. The first processor is configured to generate a first value based on the input, transmit the first value to the actuator unit, and receive a second value from the actuator unit based on a data received by the actuator unit from the first processor. The first communication link is configured to transfer the input and the second value to the second processor. The second processor is configured to determine a third value based on the input, and verify the first value based on a comparison of the second value with the third value.

15 Claims, 2 Drawing Sheets

DUAL PROCESSOR SUPERVISORY CONTROL SYSTEM FOR A VEHICLE

CROSS-REFERENCES TO RELATED APPLICATIONS

This application claims the benefit of U.S. Provisional Application No. 60/636,768, filed Dec. 15, 2004.

TECHNICAL FIELD

The present invention generally relates to control systems in a motor vehicle, and more particularly relates to dual processor control of vehicle systems.

BACKGROUND

A variety of control modules interact with different actuators during operation of a vehicle. Distributed control/actuator systems generally use a communication link to convey control information from a module to an actuator. For example, the module typically determines control commands having associated command functionalities based on various vehicle inputs/outputs and processing algorithms. The module transmits the control commands to the actuator via the communication link and the actuator, upon receiving the control commands, performs the command functionalities.

Some vehicle systems may make use of redundant processing elements to verify operation thereof such as verifying control commands transmitted from a module. When verifying command information transmitted by a module, redundant processing elements generally access the actual command information sent on the communications link. However, some control module architectures prevent redundant processing elements from having direct access to the communication link used for conveying the command functionalities. In these architectures, it is generally difficult for the redundant processing elements to properly supervise command functionalities.

One conventional supervisory control technique compares results produced from a main processing unit with a redundant processing unit. For example, the main processing unit generates one result during operation, and the redundant processing element attempts to produce an identical redundant to the result of the main processing unit. Differences between the results may indicate a problem with one of the processing units. Alternatively, the redundant processing unit may perform a computation that determines an upper and a lower limit for comparison with the results generated by the main processing unit. These techniques are generally based on comparisons made by the redundant processing unit with the actual communication from the main processing unit to an intended actuator control unit.

Accordingly, it is desirable to provide a vehicle control system that verifies control commands based on actual communication from a control module to an actuator unit. It is further desirable to provide a vehicle control system having a dual processor control module for interfacing with a vehicle actuator unit and that supervises output control commands based on data received by the vehicle actuator unit from the control module. Finally, other desirable features and characteristics of the present invention will become apparent from the subsequent detailed description and the appended claims, taken in conjunction with the accompanying drawings and the foregoing technical field and background.

BRIEF SUMMARY

A vehicle control system is provided for controlling one or more actuator units. In one exemplary embodiment, a vehicle control module for controlling an actuator unit in response to an input includes, but is not limited to, a first processor, a first communication link coupled to the first processor, and a second processor coupled to the first processor via the first communication link. The first processor is configured to generate a first value based on the input, transmit the first value to the actuator unit, and receive a second value from the actuator unit based on a data received by the actuator unit from the first processor. The first communication link is configured to transfer the input and the second value to the second processor. The second processor is configured to determine a third value based on the input, and verify the first value based on a comparison of the second value with the third value.

In another exemplary embodiment, a vehicle control system includes, but is not limited to, an actuator unit, a first communication link coupled to the actuator unit, a first processor coupled to the actuator unit via the first communication link, a second communication link coupled to the first processor, and a second processor coupled to the first processor via the second communication link. The first processor is configured to generate a first value based on a system input. The first value corresponds to a first operation mode of the vehicle control system. The actuator unit is configured to generate a second value based on a data received from the first processor corresponding to the first value. The second value includes, but is not limited to, a signature. The second processor is configured to determine a third value based on the system input, and verify the first value based on a comparison of the second value with the third value.

In yet another exemplary embodiment, a vehicle control system includes, but is not limited to, an actuator unit, a first communication link coupled to the actuator unit, and a processor coupled to the actuator unit via the first communication link. The processor includes, but is not limited to a first control path configured to generate a first value based on a system input, a second communication link coupled to the first control path, and a second control path coupled to the first control path via the second communication link. The first value corresponds to a first operation mode of the vehicle control system. The actuator unit is configured to generate a second value based on a data received from the first control path corresponding to the first value. The second value includes, but is not limited to, a signature. The second control path is configured to communicate with the first control path via the second communication link. The second control path is configured to determine a third value based on the input, and verify the first value based on a comparison of the second value with the third value.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
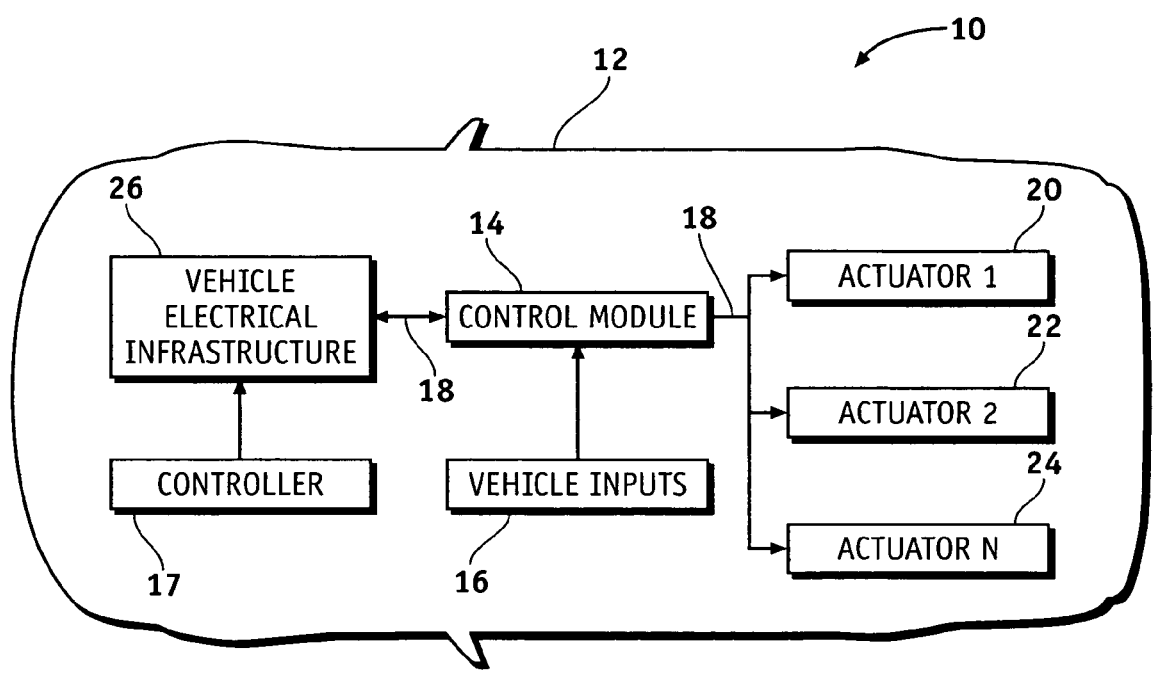
FIG. 1 is a schematic diagram of an exemplary embodiment of a vehicle control system.

Referring to the drawings, FIG. 1 is a schematic diagram of an exemplary embodiment of a control system 12 in a vehicle 10. The control system 12 is connected to a vehicle electrical infrastructure 26 via a vehicle communications network 18 and includes, but is not limited to, a control module 14 connected to one or more actuator control units 20, 22, 24 via the vehicle communications network 18. The control module 14 indirectly receives various vehicle operation inputs/outputs 17 via the vehicle communications network 18, such as from a variety of other systems and control modules of the vehicle electrical infrastructure 26, or directly receives vehicle inputs 16 such as from vehicle sensors that are connected to the control module 14.

The present invention may be described in terms of functional blocks. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, to carry out a variety of functions under the control of one or more microprocessors or other control devices. Such general techniques are known to those skilled in the art and are not described in detail herein.

The vehicle electrical infrastructure 26 may include various systems and/or subsystems on the vehicle 10, including by way of example and not of limitation a human vehicle interface, a battery power management system, an engine management system, a transmission management system, a body control module, and vehicle subsystems such as an Antilock Brake System (ABS) and an All-Wheel Drive (AWD) system. The vehicle control system 12 communicates over the vehicle communications network 18, including by way of example and not of limitation a Controller Area Network (CAN), to transfer information to and from various vehicle systems and subsystems of the vehicle electrical infrastructure 26.

The control module 14 generates control commands for transmission to the actuator control units 20, 22, 24 in response to the vehicle operation inputs 16, an operation program, or a combination thereof. In one exemplary embodiment, the control module 14 includes inputs and outputs connected to the vehicle communication network 18 that receive a variety of vehicle data from the vehicle electrical infrastructure 26 or from various sensors. Depending on a desired operation associated with the control module 14, the control module 14 transmits commands to the actuators 20, 22, 24. The control module 14 additionally includes memory that contains operation algorithms for controlling the actuator units 20, 22, 24.

Figure 2:
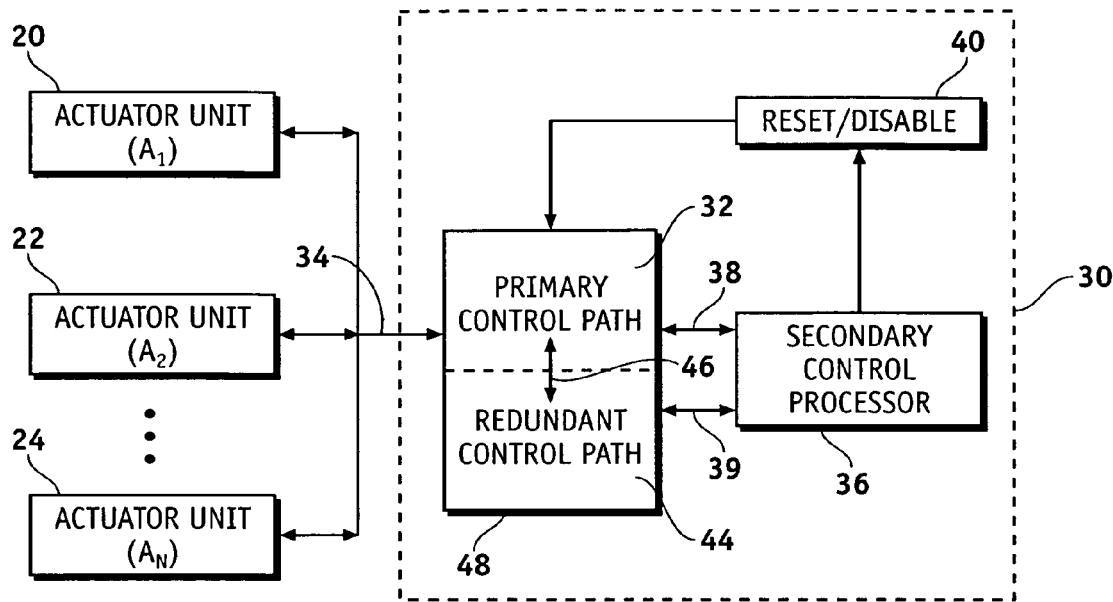
FIG. 2 is a schematic diagram of an exemplary embodiment of a dual processor control module.

FIG. 2 is a schematic diagram of an exemplary embodiment of a dual processor control module 30 such as the control module 14 shown in FIG. 1. The control module 30 includes, but is not limited to, a primary processor 48 having direct access to one or more vehicle system communications links 34, such as via the vehicle electrical infrastructure 26 or the vehicle communications network 18 shown in FIG. 1, and a secondary processor 36 connected to the primary processor 48 by a local communication link 46, such as a serial peripheral interface (SPI). The local communication link 38 transfers information, such as the input data received by the primary processor 48, between the primary processor 48 and the secondary processor 36.

In one exemplary embodiment, the primary processor 48 includes a primary control path 32 that computes various command values for actuator control based on various inputs/outputs from different vehicle systems, subsystem, sensors, and associated algorithms. The command values are transmitted to the actuator control units 20, 22, 24 along the vehicle communication link 34.

Each actuator control unit 20, 22, 24 receiving data from the primary processor 48 generates a message that is transmitted to the primary processor 48 for verification of control commands. In one exemplary embodiment, the message includes, but is not limited to, a signature that is a function of the data (i.e., command values) received by the actuator control unit 20, 22, 24. By transmitting the message to the primary processor 48, a modification of the data as transmitted by the actuator control unit 20, 22, 24 results in an incorrect signature. In another exemplary embodiment, the message additionally includes a copy of the data received by the actuator control unit 20, 22, 24 that is used for verification of the control commands transmitted by the primary processor 48, described in greater detail hereinafter.

The signature is generated using a technique that is inaccessible to the primary processor 48 to minimize the occurrence of interference by the primary processor 48 with the message generated by the actuator control units 20, 22, 24. For example, the signature may be generated by the actuator control units 20, 22, 24 with a Cyclic Redundancy Code (CRC) using a generator polynomial unknown to the primary processor 48, a Message Authentication Code (MAC) based on a key that is unknown to the primary processor 48, a digital signature, or the like. The messages generated by the actuator control units 20, 22, 24 are subsequently forwarded, without modification, by the primary processor 48 to the secondary processor 36 via the local communication link 38.

In one exemplary embodiment of verification, the primary processor 48 forwards the input data, used by the primary processor 48 in generating the control commands, to the secondary processor 36 as previously mentioned herein. The secondary processor 36 generates command values using the input data and compares such command values with the signature contained in the messages from the actuator control units 20, 22, 24. A matching signature implies that the secondary processor 36 has a substantially unmodified copy of the message originally sent by the actuator control unit 20, 22, 24.

In another exemplary embodiment, the message from the actuator control unit 20, 22, 24 additionally includes the copy of the data received by the actuator control unit 20, 22, 24 from the primary processor 48. The secondary processor 36 compares the computed command values with the data in the messages from the actuator control unit 20, 22, 24 which, in turn, is the command data actually sent by the primary processor 48. A discrepancy in the comparison indicates a failed verification. Alternatively, the secondary processor 36 may compute a range of values based on the input data received from the primary processor 48 for comparison with the data in the messages from the actuator control unit 20, 22, 24. A failed verification results when the data in the messages falls outside of the range of values.

In another exemplary embodiment, the control module 30 has independent dual computational/memory control paths 32, 44 within the primary processor 48 for verifying control commands. In this exemplary embodiment, a primary control path 32 is connected to a redundant control path 44 via a local communication link 46. Additionally, the primary control path 32 is connected to the secondary processor 36 via the local communication link 38, and the redundant control path 44 is connected to the secondary processor 36 via another local communication link 39. In this exemplary embodiment, the redundant control path 44 is an additional processing element that is connected to the secondary processor 36. The primary control path 32 passes the input data for computing command values, such as received by the primary processor 48 from various vehicle inputs 16, to the redundant control path 44, and the redundant control path 44 generates command values from the input data. The use of independent dual computational/memory control paths 32, 44 generally has an advantage of faster processing rates and is suited for control applications sensitive to data processing rates.

In an exemplary embodiment incorporating the dual computational/memory control paths 32, 44, the messages generated by the actuator control units 20, 22, 24 are forwarded, without modification, from the primary control path 32 to the redundant control path 44 via the local communication link 46. The redundant control path 44 verifies whether the data contained in the messages from the actuator control units 20, 22, 24 match the corresponding signatures in a manner substantially similar in operation with the secondary processor 36 as previously mentioned.

To verify the command values transmitted by the primary processor 48, the redundant control path 44 computes command values based on the input data received from the primary processor 48 and compares the computed command values with the signature contained in the messages and optionally with the copied data in the messages from the actuator control units 20, 22, 24 as determined by the message format (i.e., signature with or without copied data). A discrepancy in the comparison indicates a failed verification. Alternatively, the dual computational/memory control path 44 may compute a range of values based on the input data received from the primary control path 32 for comparison with the data in the messages from the actuator control units 20, 22, 24. A failed verification results when the data in the messages falls outside of the range of values. When the redundant control path 44 determines a failed verification, the redundant control path 44 indicates the same to the secondary processor 36 such as an error signal transmission via the local communication link 38.

When the secondary processor 36 determines that a failed verification has occurred, the secondary processor switches the vehicle control system 12 (FIG. 1) to a safe operation mode. In one exemplary embodiment of a safe operation mode, the secondary processor 36 disables or resets the primary processor 48 under one or more of the following conditions: when no data is received by the secondary processor 36 from the primary processor 48 for a pre-determined amount of time; when no data is received by the redundant control path 44 from the primary control path 32 for a pre-determined amount of time; when the data contained in the message from the actuator control units 20, 22, 24 does not match the corresponding signature; when the data contained in the message from the actuator control units 20, 22, 24 exceeds the range of values; when the signature does not match the command values computed by the secondary processor 36; and, when a request is received from the redundant control path 44. The pre-determined amount of time may be selected based upon an expected response time for data transmission.

Other techniques may be used to disable/reset the primary processor 48 such as a vehicle sub-system 40, coupled between the secondary processor 36 and the primary processor 48, that transmits a reset or disable signal to the primary processor 48 for an amount of time sufficient for the actuator control units 20, 22, 24 to take remedial action. Additionally, other techniques may be used to switch the operation mode of the vehicle control system 12 (FIG. 1) to a safe operation mode without disabling or resetting the primary processor 48.

Figure 3:
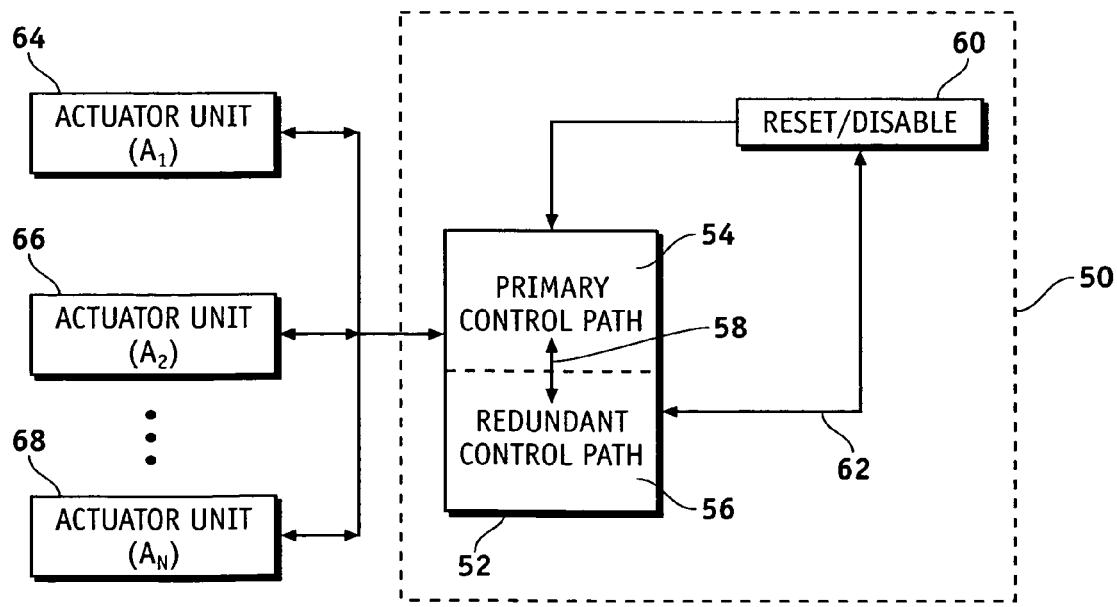
FIG. 3 is a schematic diagram of another exemplary embodiment of a dual processor control module.

FIG. 3 is another exemplary embodiment of a dual processor control module 50. The control module 50 includes, but is not limited to a primary processor 52 connected to actuator control units 64, 66, 68, such as the primary processor 30 connected to the actuator control units 20, 22, 24 shown in FIG. 2. The primary processor 52 utilizes independent dual computational/memory control paths 54, 56 that are connected via the local communication link 58, such as the primary control path 32 connected to the redundant control path 44 via the local communication link 46 shown in FIG. 2. The redundant control path 56 is connected to a reset/disable sub-system 60 which is connected to the primary processor 52. In this exemplary embodiment, the primary processor 52 verifies command values internally and switches operation mode of the vehicle control system 12 (FIG. 1) to the safe mode in response to failed verifications through the reset/disable sub-system 60. Although the safe mode is described as a reset/disable function, the operation mode of the vehicle control system 12 (FIG. 1) may be switched to the safe mode using various other techniques.

In this exemplary embodiment, the redundant control path 56 signals a failed verification to the reset/disable sub-system 60 to switch the operation mode to the safe mode. A failed verification is determined by the redundant control path 56 when one or more of the following conditions occur: when no data is received by the redundant control path 56 from the primary control path 54 for a pre-determined amount of time; when the data contained in the message from the actuator control units 64, 66, 68 does not match the corresponding signature; when the data contained in the message from the actuator control units 64, 66, 68 exceeds the range of values; and, when the signature does not match the command values computed by the redundant control path 56.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicle control module for controlling an actuator unit in response to an input, the vehicle control module comprising:

a first processor configured to:
        generate a first value based on said input;
        transmit said first value to the actuator unit; and
        receive a second value generated by the actuator unit, said second value comprising a signature based on a data received by the actuator unit from said first processor;
    first and second communication links coupled to said first processor; and a second processor coupled to said first processor via said first communication link, said first communication link configured to transfer said input and said second value to said second processor, said first processor is further configured to transmit said first value to said second processor via said second communication link and transfer said second value to said second processor, said second processor configured to:
determine a third value based on said input;
verify said first value based on a comparison of said second value with said third value;
disable said first processor when at least one of:
no data is received by said second processor from said first processor for a pre-determined amount of time,
said second value and said third value do not match, and
said signature and said first value received by said second processor from said first processor do not match; and
switch the vehicle control system to a second operation mode when said second value is outside of said third value, wherein said first processor comprises:
a first control path capable of being coupled to said actuator unit via said first communication link and coupled to said second processor via said second communication link, said first control path configured to generate said first value based on said input;
a third communication link coupled to said first control path;
a second control path coupled to said first control path via said third communication link, said second control path configured to:
generate a fourth value based on said system input; and
verify said first value based on a comparison of said fourth value with said second value; and
a fourth communication link coupling said second control path with said second processor.

2. A vehicle control module according to claim 1, wherein said signature is a mathematical function of said data received by the actuator unit from said first processor.

3. A vehicle control module according to claim 1, wherein said second value further comprises said data received by the actuator unit from said first processor; and
wherein said second processor is further configured to disable said first processor when said signature and said data received by the actuator unit from said first processor do not match.

4. A vehicle control module according to claim 1, wherein said second processor is an independent computational path in said first processor.

5. A vehicle control module according to claim 3, wherein said third value comprises a range of values; and
wherein said second processor is further configured to reset said first processor when said second value is outside of said range of values.

6. A vehicle control module according to claim 1, wherein the actuator unit is coupled to said first processor via a second communication link and configured to generate said signature without duplication by said first processor.

7. A vehicle control module according to claim 1, wherein said first processor is configured to transfer said second value to said second processor without alteration of said second value.

8. A vehicle control system comprising:
an actuator unit;
a first communication link coupled to said unit;
a first processor coupled to said actuator unit via said first communication link, said first processor configured to generate a first value based on a system input, said first value corresponding to a first operation mode of the vehicle control system, said actuator unit configured to generate a second value based on a data received from said first processor corresponding to said first value, said second value comprising a signature;
a second communication link coupled to said first processor; and
a second processor coupled to said first processor via said second communication link, said second processor configured to:
determine a third value based said system input;
verify said first based on a comparison of said value with said third value, and
switch the vehicle control system to a second operation mode when at least one of:
no data is received from said first processor by said second processor for a first amount of time;
said second value and said third value do not match; and
said signature does not correspond with said first value, wherein said first processor comprises:
a first control path coupled to said actuator unit via said first communication link and coupled to said second processor via said second communication link, said first control path configured to generate said first value based on said system input;
a third communication link coupled to said first control path;
a second control path coupled with said first control path via said third communication link, said second control path configured to:
generate a fourth value based on said system input; and
verify said first value based on a comparison of said fourth value with said second value; and
a fourth communication link coupling said second control path with said second processor.

9. A vehicle control system according to claim 8, wherein said signature is a mathematical function of said data received by said actuator unit corresponding to said first value.

10. A vehicle control system according to claim 8, wherein said second value further comprises said data received by said actuator corresponding to said first value; and
wherein said second processor is further configured to switch the vehicle control system to said second operation mode when said signature does not correspond with said data.

11. A vehicle control system according to claim 8, wherein said second processor is further configured to switch the vehicle control system to said second operation mode when at least one of:
no data is received from said first control path by said second control path for a pre-determined amount of time;
said signature does not correspond with said fourth value; and
said first value and said fourth value do not match.

12. A vehicle control system according to claim 8, wherein said third value comprises a range of values;
wherein said first processor is further configured to transmit said first value to said second processor via said second communication link; and
wherein second processor is further configured to switch the vehicle control system to a second operation mode when said second value is outside of said third value.

13. A vehicle control system according to claim 8, wherein said fourth value comprises a range of values; and
    wherein said second processor is further configured to switch the vehicle control system to said second operation mode when said first value is outside of said fourth value.

14. A vehicle control system according to claim 8, wherein said actuator unit is configured to generate said signature without duplication by said first processor.

15. A vehicle control system according to claim 8, wherein said second operation mode comprises one of:
    said second processor disabling said first processor for a second amount of time sufficient for a remedial action by said actuator unit; and
    said second processor resetting said first processor for a third amount of time sufficient for a remedial action by said actuator unit.

* * * * *